United States Patent
He et al.

(10) Patent No.: US 12,154,259 B2
(45) Date of Patent: Nov. 26, 2024

(54) PROCESS OF PROVIDING AN INTERPRETED BOREHOLE IMAGE

(71) Applicant: Schlumberger Technology Corporation, Sugar Land, TX (US)

(72) Inventors: Alexis He, Clamart (FR); Bashar Qamhiyeh, Clamart (FR); Martin Carles, Clamart (FR); Laetitia Comparon, Clamart (FR); Nadege Bize-Forest, Clamart (FR); Isabelle Le Nir, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 59 days.

(21) Appl. No.: 18/173,484

(22) Filed: Feb. 23, 2023

(65) Prior Publication Data
US 2023/0267594 A1 Aug. 24, 2023

Related U.S. Application Data

(60) Provisional application No. 63/268,374, filed on Feb. 23, 2022.

(51) Int. Cl.
*E21B 47/002* (2012.01)
*G06T 7/00* (2017.01)
*E21B 7/04* (2006.01)

(52) U.S. Cl.
CPC ........ *G06T 7/0004* (2013.01); *E21B 47/0025* (2020.05); *E21B 7/04* (2013.01);
(Continued)

(58) Field of Classification Search
CPC ......... G06T 7/0004; G06T 2207/20081; G06T 2207/30181; E21B 47/0025; E21B 7/04; E21B 2200/20; G01V 3/38; G01V 1/50
(Continued)

(56) References Cited

U.S. PATENT DOCUMENTS

| 9,141,673 B2 | 9/2015 | Chau |
| 10,151,857 B2 | 12/2018 | Yamada et al. |

(Continued)

FOREIGN PATENT DOCUMENTS

WO 2020146863 A1 7/2020

OTHER PUBLICATIONS

Search Report and Written Opinion of International Patent Application No. PCT/US2023/013698 dated Jun. 14, 2023, 9 pages.
(Continued)

*Primary Examiner* — Sheela C Chawan
(74) *Attorney, Agent, or Firm* — Jeffrey D. Frantz

(57) ABSTRACT

Process for interpreting one or more borehole images for use in drilling operations. In some embodiments, the process can include providing an input borehole image obtained from a downhole measurement provided by one or more downhole sensors. The process can also include collecting contextual information relative to the borehole image and the user. The process can also include using the collected contextual information and a mathematical model to infer one or more processing arguments. The mathematical model can be defined by using previously collected arguments and previously collected contextual information. The process can also include processing the input borehole image with the one or more inferred processing arguments to generate one or more interpreted borehole images. The process can also include adjusting one or more drilling operation based, at least in part, on the one or more interpreted borehole images.

15 Claims, 3 Drawing Sheets

(52) U.S. Cl.
CPC . *E21B 2200/20* (2020.05); *G06T 2207/20081* (2013.01); *G06T 2207/30181* (2013.01)

(58) Field of Classification Search
USPC .................................................. 382/100, 109
See application file for complete search history.

(56) References Cited

U.S. PATENT DOCUMENTS

| | | |
|---|---|---|
| 10,755,427 B2 | 8/2020 | Matsumura et al. |
| 2011/0302004 A1 | 12/2011 | Johnson et al. |
| 2012/0209655 A1 | 8/2012 | Ramachandran |
| 2015/0212657 A1 | 7/2015 | Schilit |
| 2015/0248494 A1 | 9/2015 | Mital et al. |
| 2016/0063145 A1 | 3/2016 | Chang et al. |
| 2017/0357525 A1 | 12/2017 | Gatson et al. |
| 2018/0280118 A1 | 10/2018 | Cramer |
| 2020/0011158 A1 | 1/2020 | Xu |
| 2021/0300756 A1 | 9/2021 | Kobayashi et al. |

OTHER PUBLICATIONS

Pattnaik, S. et al., ""Automatic Carbonate Rock Facies Identification with Deep Learning", SPE201673, presented at the SPE Annual Technical Conference Exhibition, 2020, 10 pages."
Moorkamp, M. et al., "Verification of velocity-resistivity relationships derived from structural joint inversion with borehole data", Geophysical Research Letters, Jul. 23, 2013, 40, pp. 3596-3601.

PROCESS OF PROVIDING AN INTERPRETED BOREHOLE IMAGE

CROSS-REFERENCE TO RELATED APPLICATIONS

This application claims the benefit of U.S. Provisional Application No. 63/268,374 entitled "Method of Providing an Interpreted Borehole Image," filed Feb. 23, 2022, the disclosure of which is incorporated herein by reference in its entirety.

Embodiments described generally relate to borehole image interpretation.

BACKGROUND

In order to evaluate a geological formation, downhole measurements can be performed while the well is drilled using Logging While Drilling (LWD) tools or after the well is drilled, using processes such as wireline or slickline tools lowered into the borehole with a cable. These tools can include a variety of sensors that enable an operator to generate sensor measurements from the borehole wall, showing the geological structure of the formation. Once sensor measurements are obtained, however, there are a number of operations required to obtain information regarding the geological formation.

The operations used to obtain information regarding the formation can include borehole image processing and borehole image interpretation. Current borehole image processing converts sensor measurements into an interpretation-ready borehole image. The borehole image processing, however, requires a multitude of successive operations involving a number of algorithms and software as well as user defined arguments. The interpretation of the borehole images can provide information with regard to the geological formation, but like borehole image processing, the interpretation of such images also requires a multitude of successive operations involving a number of algorithms and software as well as user defined arguments. The successive operations and user defined arguments can significantly delay borehole image interpretation needed for continued drilling operations as well as introduce costly errors.

There is a need, therefore, for improved borehole image processing and borehole image interpretation.

SUMMARY

A process for providing an interpreted borehole image for drilling operations is provided. In some embodiments, the process can include providing an input borehole image obtained from a downhole measurement provided by one or more downhole sensors to a user. Contextual information relative to the borehole image and the user can be collected. The collected contextual information and a mathematical model can be used to infer one or more processing arguments. The mathematical model can be defined by using previously collected arguments and previously collected contextual information. The input borehole image with the one or more inferred processing arguments can be processed to generate an interpreted borehole image. One or more drilling operations can be adjusted based at least in part on the interpreted borehole image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are, therefore, not to be considered limiting of its scope, for the invention may admit to other equally effective embodiments. It is emphasized that the figures are not necessarily to scale and certain features and certain views of the figures can be shown exaggerated in scale or in schematic for clarity and/or conciseness.

DETAILED DESCRIPTION

Figure 1:
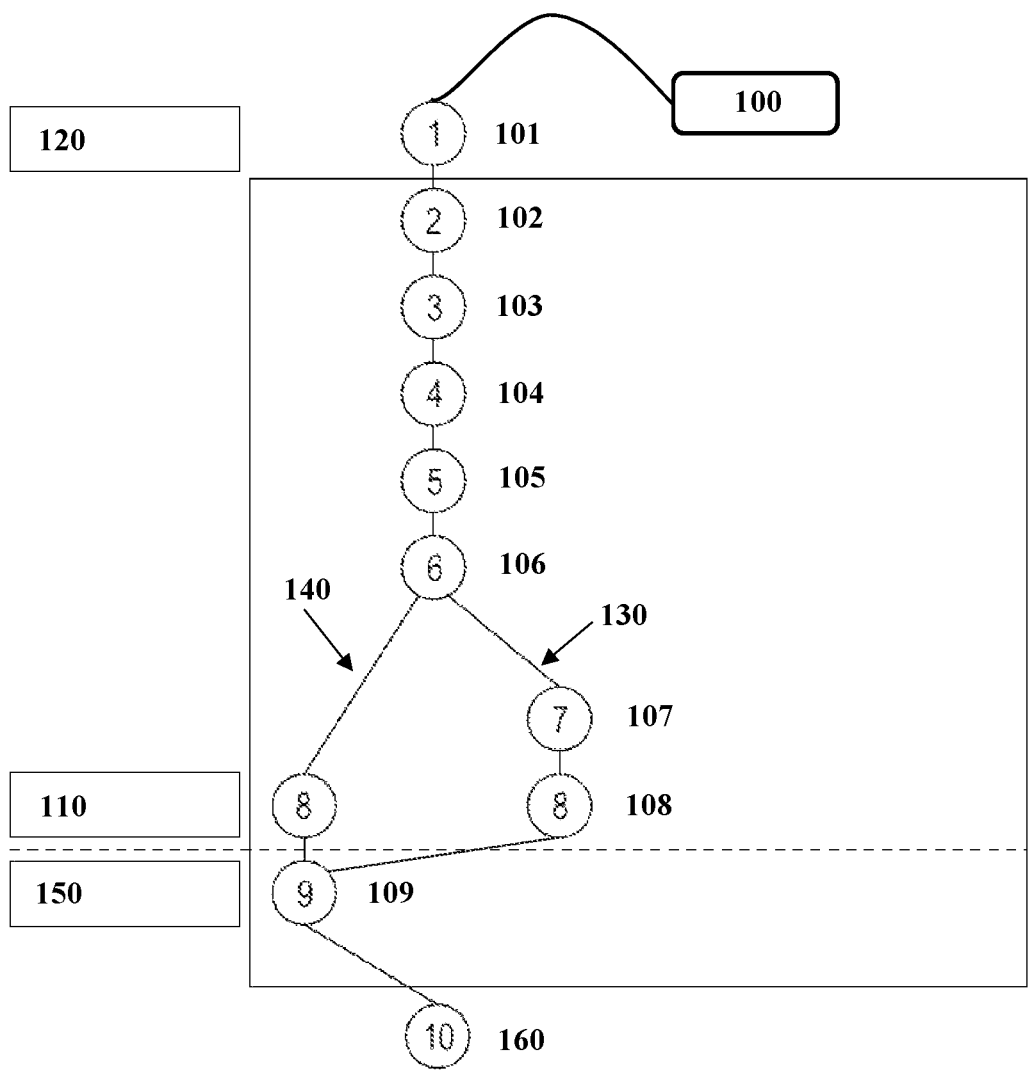
FIG. 1 depicts an illustrative process for interpreting a borehole image, according to one or more embodiments described.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Furthermore, in the following discussion and in the claims, the terms "including" and "comprising" are used in an open-ended fashion, and thus should be interpreted to mean "including, but not limited to."

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an olefin" include embodiments where one, two, or more olefins are used, unless specified to the contrary or the context clearly indicates that only one olefin is used.

Unless otherwise indicated herein, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions, and examples, but the inventions are not limited to these embodiments, versions or examples, which are included to enable a person having ordinary skill in the art to make and use the inventions, when the information in this disclosure is combined with publicly available information and technology.

In one or more embodiments, a process for interpreting a borehole image can proceed in an automatic way. In one or more embodiments, the process for interpreting the borehole image can be initiated via a user initiating the process and such process can proceed thereafter without user supervision. In one or more embodiments, the process can complete a plurality of known or future processing and interpretation operations, using the output of one workflow as the input of a subsequent operation.

In one or more embodiments, the process can record user-defined arguments modified manually by a user. The user-defined arguments can include inputs, outputs, parameters, or a combination thereof. Illustrative inputs can include borehole measurements, such as physical property curves, and the like and/or sensor data or image data, such as gamma ray, resistivity, density, borehole trajectory, and the like, or any combination thereof. Illustrative outputs can include any results of processes and/or commands, such as computed tool motion information, concatenated borehole images, estimated dips, and the like, or any combination thereof. Illustrative parameters can include boundary conditions, thresholds, computation options, window sizes, default values, and the like, or any combination thereof. The process can build a database of argument usage history for given workflows based, at least in part, on the recorded user-defined arguments. In one or more embodiments, the process can analyze past user-defined argument settings to make an optimal suggestion according to the current context, inputs, outputs, and/or parameters.

FIG. 1 depicts an illustrative process for interpreting a borehole image, according to one or more embodiments. The process can include a preprocessing section 110 and an interpretation section 150. The preprocessing section 110 can include importing or otherwise providing a borehole image 101 obtained from a downhole measurement provided by one or more downhole sensors 100 a first borehole image processing step 102, a second borehole image processing step 103, a third borehole image processing step 104, a button harmonization step 105, a pad depth matching step 106, a histogram equalization step 107, and a pad concatenation step 108. The file import 101, the first borehole image processing step 102, the second borehole image processing step 103, the third borehole image processing step 104, the button harmonization step 105, and the pad depth matching step 106 can be part of an input step 120. The histogram equalization step 107 and pad concatenation step 108 can be part of a dynamic preprocessing step 130. The preprocessing section 110 can also include a static preprocessing step 140. The interpretation section 150 can be configured to receive information from the preprocessing section 110 from the dynamic preprocessing step 130 and/or the static preprocessing step 140. The interpretation section 150 can include a workflow specification 109. The workflow specification 109 can include any interpretation process suitable for converting information from the preprocessing section 110 to provide a user with a drilling operation modification.

In one or more embodiments, the first borehole image processing step 102 can include composite processing, multi-image combination, multi-bandwidth combination, and the like, or any combination thereof. In one or more embodiments, the second borehole image processing step 103 can include caliper despiking, noise reduction, error truncation, and the like, or any combination thereof. In one or more embodiments, the third borehole image processing step 104 can include image padding or similar image preparation techniques intended to preserve image size after filtering, processing, and the like, or any combination thereof.

In one or more embodiments, a dip in a formation can be determined by the process depicted in FIG. 1. The dip in a formation can be transitions within a formation between geological layers of formation material. The dip in the formation can be determined by the orientation of the geological layers around the borehole. In one or more embodiments, the one or more dips in the formation can be determined to allow a user to infer, create, and/or design a model of the formation based upon geological layers.

In one or more embodiments, the drilling operation can include any downhole drilling process and/or operation, evaluation of the surrounding formation, or similar operation that can use information from the interpretation section 150 to improve the same. In one or more embodiments, the drilling operation can include geosteering. Geosteering can include directing, controlling, and/or manipulating the path of a drilling operation to follow a desired path. The desired path can include drilling and remaining within a desired geological layer of the formation, e.g., a topmost geological layer of the formation. The desired geological layer can include greater hydrocarbon availability as compared to surrounding geological layers. The desired geological layer can also include a region of the formation that avoids other regions of the formation that include drilling hazards, such as water columns, salt domes, and the like. In order to maximize hydrocarbon production, boreholes can be drilled horizontally in the formation to remain within the desired geological layer. In one or more embodiments, the drilling operation can include already drilled boreholes, boreholes in the process of being drilled, boreholes that have yet to be drilled, and the like, or any combination thereof.

In one or more embodiments, information from the interpretation section 150 can provide one or more interpreted borehole images to allow the user and/or the process to modify geosteering with regard to the information provided about the formation. In some embodiments, hydrocarbon production can be increased or maximized by using one or more interpreted borehole images to locate and avoid water columns during drilling operations. In some embodiments, one or more interpreted borehole images can be used to locate naturally occurring fractures within the formation. In some embodiments, naturally occurring fractures within the formation can be detected using the one or more interpreted borehole images and can be desirable due to their high permeability. Hydrocarbon production can be increased or maximized by using the naturally occurring fractures located within the formation via the one or more interpreted borehole images to geosteer drilling operations into and/or through the naturally occurring fractures. In some embodiments, one or more interpreted borehole images can be used to detect breakouts and/or drilling-induced fractures. Breakouts and/or drilling-induced fractures can reduce the efficacy, stability, and/or safety of drilling operations. Breakouts and/or drilling-induced fractures can be caused by drilling too fast, excessive mud pressure, insufficient cement quantity, insufficient tubing installation, and the like, or any combination thereof. Hydrocarbon production can be increased or maximized by using detected breakouts and/or drilling-induced fractures to modify drilling operations to reduce the likelihood, amount, and/or severity of subsequent breakouts and/or drilling induced fractures. In some embodiments, a drilling operation can be adjusted based at least in part on the interpreted borehole image by slowing down drilling, reducing the mud pressure, increasing a quantity of cement introduced into the borehole, and/or installing tubing within the borehole to prevent collapse. In such embodiments, the adjustment of the drilling operation can occur sooner than initially planned in the drilling operation due to the interpreted borehole image.

Processing and interpreting borehole image data can involve a workflow of a plurality of processing and interpretation operations, such as shown in FIG. 1. In some embodiments, the process shown in FIG. 1 can be a workflow for electromagnetic measurement with a wireline tool. In some embodiments, the process can apply to other workflows with electromagnetic measurements, different workflows with a different measurements, such as acoustic, nuclear, seismic, or different electromagnetic measurements, or any combination thereof, and/or a different tool, such as a LWD tool and/or the like.

In one or more embodiments, the process can automate the connections between operations, which can include automatically setting user defined arguments such as inputs, outputs and/or exposed parameters, or any combination thereof. The inputs can be inferred, measured from one or more sensors, selected by one or more users, and the like, or any combination thereof. In one or more embodiments, the process can include one or more user-defined arguments and/or one or more processing-defined arguments. The processing-defined arguments can be any argument not defined by a user that can be defined by a processor without user input. In one or more embodiments, the user-defined arguments involving inputs and outputs can be resolved with deterministic rules such as bivalent and/or trivalent logics. In one or more embodiments, the user-defined arguments involving parameters can be resolved using default arguments defined by a user, by collecting user-defined argument changes made by a user each time a workflow has been ran, and/or building a workflow usage history. In one or more embodiments, the users can give feedback and/or change one or more of the user-defined arguments.

In one or more embodiments, setting user-defined arguments based on workflow usage history can enable setting user-defined arguments that are as good or better than the default parameters. The user-defined arguments can be set as a function of user history as well as contextual information, such as a type of geological formation the borehole is located within; a user profile; a feature of interest in the geological formation the borehole is located within; and/or any combination thereof. In one or more embodiments, the user profile can include user input data that includes model and argument choice, contextual information related to the drilling operations and/or formation, preferred interpretation methods, and/or user review and/or selection of interpreted borehole images, and the like, or any combination thereof. In some embodiments, the contextual information that can be provided is an orientation of the borehole. In one or more embodiments, the orientation of the borehole can be utilized to control the direction, angle, and/or trajectory of the borehole while drilling to accurately navigate the strata according to one or more operational needs. In some embodiments, workflow usage history can increase with time as the number of user-defined arguments increases. As such, as the workflow usage history data increases, the automatic setting of user-defined arguments can become more accurate and the quality of automation can be improved.

In one or more embodiments, the setting of user-defined arguments can use machine-learning methods, neural networks, algorithms, and/or other mathematical methods, and/or any combination thereof, as well as contextual information. In some embodiments, the setting of user-defined arguments can include using expert systems with well-defined rules based on contextual information. The well-defined rules can include setting user-defined arguments based on one or more known ranges of borehole deviation, borehole pressure, other contextual information, or any combination thereof. In some embodiments, the algorithms can include estimating an optimal user-defined argument based on contextual information. In some embodiments, the algorithms can include statistical formulas, such as average mean, median, standard deviation, and the like, or any combination thereof, and/or more complex formulas, such as k-means clustering, Otsu's threshold, Fourier's transform, band filters, and the like, or any combination thereof.

In some embodiments, the machine-learning method can be used as a training set that can be used to train the machine-learning algorithm in a training phase. Each occurrence of the training set can include user-defined arguments as well as contextual data. Each occurrence of the training can help tune the parameters of the machine learning method. In some embodiments, the machine learning method can infer the user-defined arguments that can be used for the workflow specification 109. In some embodiments, the machine learning can be an unsupervised model. In some embodiments, additional relevant data can be fed to the machine-learning method, such as a new user marking a set of parameters as preferred or marking an algorithm to output a quality control. In some embodiments, the machine learning method can also include supervised learning via the user to improve prediction and/or suggestion by promoting a user-defined argument directly within the internal logic of the workflow. In some embodiments, the machine learning method can maximize user convenience by providing consistent interpretation results while requiring limited or even no input from the user. In some embodiments, the machine learning method can include random decision forests, support vector machines, k-means clustering, and the like, or any combination thereof. In some embodiments, the machine learning method can be network and/or non-network.

In one or more embodiments, the process can display the one or more interpreted borehole images to one or more users for review, evaluation, use, and the like, or any combination thereof. The user can make one or more decisions based upon the displayed one or more interpreted borehole images in order to make corrections, changes, alterations, and the like, or any combination thereof to drilling operations. In one or more embodiments, the user can change input step 120 and/or contextual information based upon the display of the one or more interpreted borehole images.

Figure 2:
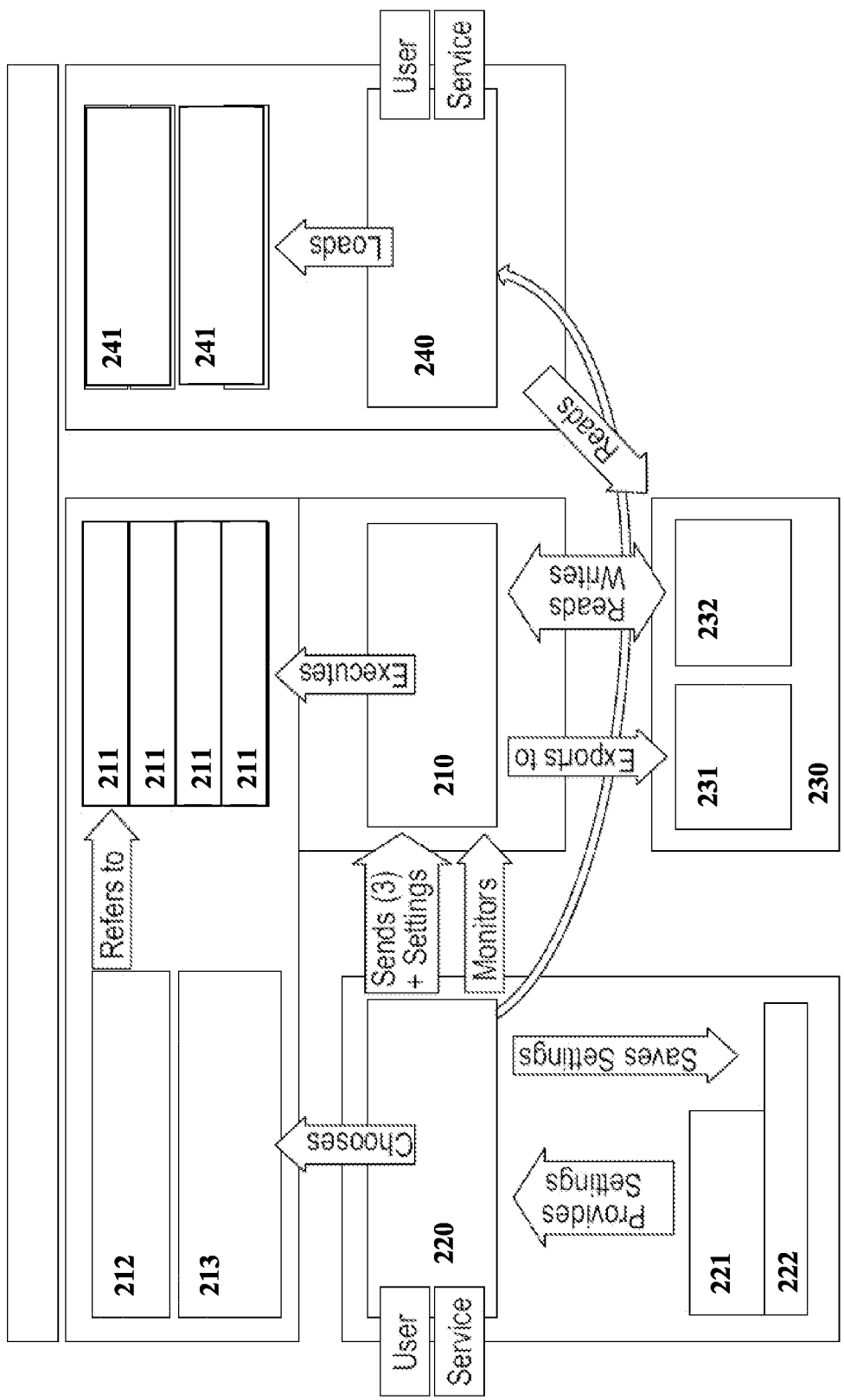
FIG. 2 depicts a schematic representation of an interpretation section of the process depicted in FIG. 1, according to one or more embodiments described.

FIG. 2 depicts a schematic representation of an interpretation section of the process depicted in FIG. 1, according to one or more embodiments. In some embodiments, the interpretation section can include four interconnected components: a workflow engine 210, a workflow controller 220, a data handler 230, and a data visualizer 240. In some embodiments, the workflow engine 210 can include a plurality of processing steps 211, a first workflow specification 212, and a second workflow specification 213. In some embodiments, the workflow controller 220 can include an argument engine 221 and argument database 222. In some embodiments, the data handler 230 can include deliverable storage 231 and data sources 232. The data visualizer 240 can include a plurality of visualization templates 241.

In one or more embodiments, the workflow engine 210 and the workflow controller 220 can include interacting components that support the process. For example, the workflow engine 210 and the workflow controller 220 can allow user-defined argument collection in the training phase of the process and can provide optimized user-defined arguments in an interpretation section 150 of the process.

Figure 3:
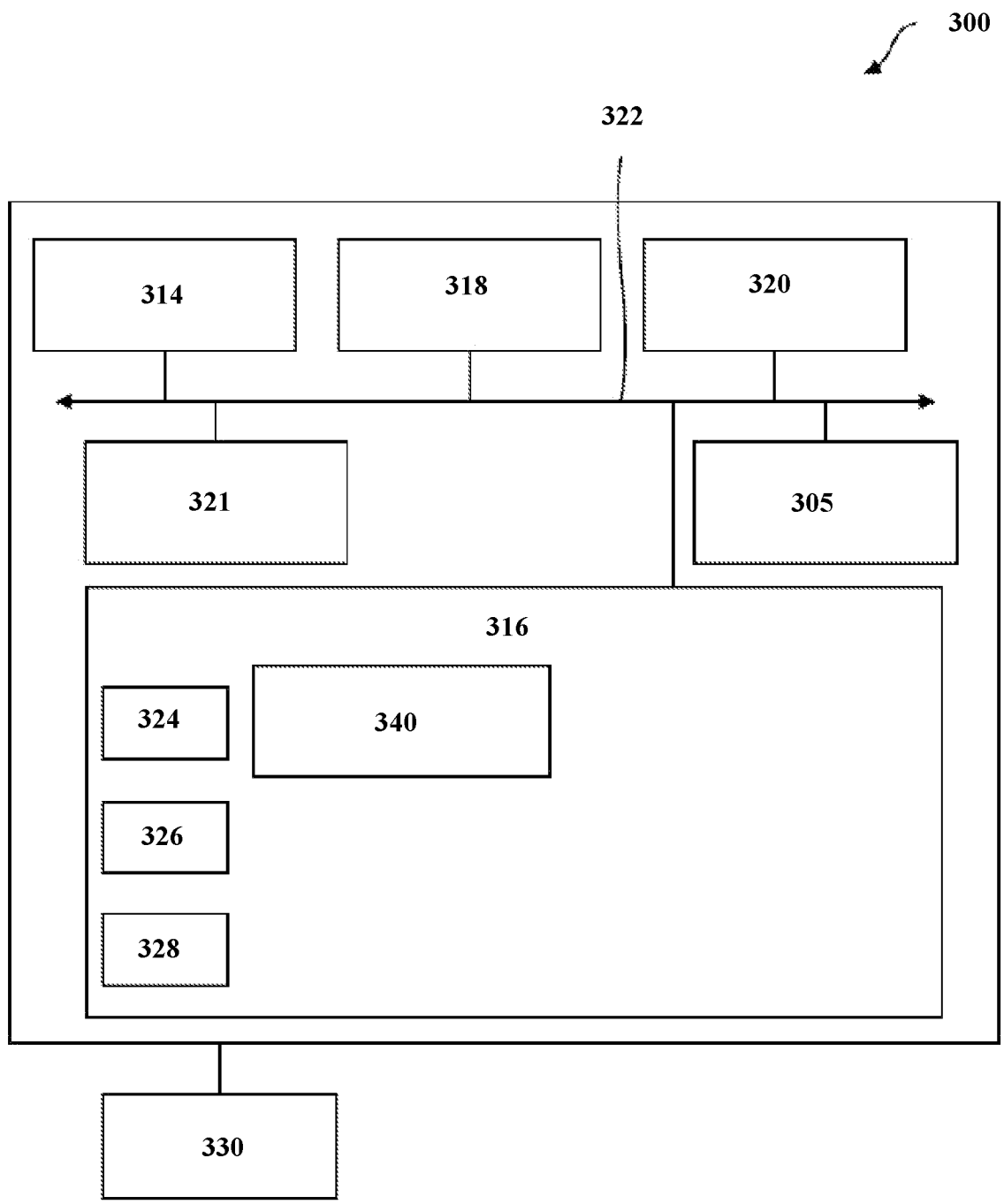
FIG. 3 depicts a schematic of an illustrative computing system that can be used to carry out the process shown in FIG. 1, according to one or more embodiments according to one or more embodiments.

FIG. 3 depicts a schematic of an illustrative computing system 300 that can be configured to carry out the process shown in FIG. 1, according to one or more embodiments. The computer system 300 can be located within a facility or can be located elsewhere. One or more chips, for example chips 305 and/or 321, can be or can include field-programmable gate arrays ("FPGAs"), application specific integrated circuits ("ASICs"), chiplets, Multi-Chip-Modules, central processing units ("CPUs"), and/or system-on-chips ("SOCs"), to name a few. The chip can be used in a wide-range of applications, including but not limited to image processing, input data organization, or other digital processing systems. The ASICs can include entire microprocessors, memory blocks including read only memory (ROM), random access memory (RAM), erasable programmable read only memory (EPROM), electrically erasable programmable read only memory (EEPROM), flash memory and other building blocks and can be known as system-on-chip ("SoC").

To achieve its desired functionality, the computing system 300 can include various hardware and software components. Among these components can be one or more processors 314 and a command actuator 340. These hardware components can be interconnected through the use of a number of electrical connections, busses, and/or network connections. In one embodiment, the processor 314, the chip 305, the chip 321, and the command actuator 340 can be communicatively coupled via a bus 322. The bus 322 can be or include any know computing system bus. The command actuator 340 can be internal to a data storage device 316.

The chip 305, the chip 321, and/or the command actuator 340 can include, either separately or in some combination, software and hardware, including tangible, non-transitory computer readable medium (not shown), for interpreting one or more borehole images. In some embodiments, the one or more borehole images can be interpreted via statistical formulas, such as average mean, median, standard deviation, and the like, or any combination thereof, and/or complex formulas, such as k-means clustering, Otsu's threshold, Fourier's transform, band filters, and the like, or any combination thereof. Other known algorithms and/or suitable algorithms developed in the future can also be used. In some embodiments, the command actuator 340 can be integrated into the chip 305, the chip 321, and/or the processor 314. In some embodiments, the chip 305 and/or the chip 321 can be integrated into the processor 314. Although the command actuator 340 is depicted as being internal to the data storage device 316, in other embodiments, the command actuator 340 can be a peripheral device (not shown) coupled to the computing system 312 or included within a peripheral device (not shown) coupled to the computing system 312.

The command actuator 340 can include instructions that when executed by the command actuator 340 can cause the command actuator 340 to implement at least the functionality of receiving information through a network adapter, processing the information from the one or more downhole sensors through the processor according to the instructions stored in the memory to create a command, and for interpreting one or more borehole images according to the command. In some embodiments, the instructions can, when executed by the command actuator 340, cause the command actuator 340 to use one or more inversion procedures or techniques to interpret one or more borehole images using the information received. In some embodiments, the instructions can, when executed by the command actuator 340, cause the command actuator 340 to use optimization-based analyses to infer the one or more borehole images using the one or more inference models.

In one or more embodiments, the command actuator 340 can work in conjunction with the processor 314 to implement the functionality described above. In some embodiments, the command actuator 340 can execute firmware code stored on the computing system 300, such as on the chip 305, the chip 321, and/or the processor 314. The functionality of the computing system 300 and/or the command actuator 340 can be in accordance with the processes of the present specification described herein. In the course of executing code, the processor 314 and/or the command actuator 340 can receive input from and provide output to a number of the remaining hardware units.

The computing system 300 can be implemented in an electronic device. Examples of electronic devices include servers, desktop computers, laptop computers, cloud-based computers, personal digital assistants ("PDAs"), mobile devices, smartphones, gaming systems, and tablets, among other electronic devices. The computing system 300 can be utilized in any data processing scenario including, stand-alone hardware, mobile applications, through a computing network, or combinations thereof. Further, the computing system 300 can be used in a computing network, a public cloud network, a private cloud network, a hybrid cloud network, other forms of networks, or combinations thereof. In one example, the processes provided by the computing system 300 can be provided as a service by a third party.

To achieve its desired functionality, the computing system 300 can include various other hardware components. Among these other hardware components can be a number of data storage devices or tangible, non-transitory computer readable medium 316, a number of peripheral device adapters 318, and a number of network adapters 320. These hardware components can be interconnected through the use of a number of electrical connections, busses, and/or network connections.

The chip 305, the chip 321, and/or the processor 314 can include the hardware and/or firmware/software architecture to retrieve executable code from the data storage device 316 and execute the executable code. The executable code can, when executed by the chip 305, the chip 321, and/or the processor 314, cause the chip 305, the chip 321, and/or the processor 314 to implement at least the functionality of receiving information through a network adapter, processing the information from the one or more downhole sensors and interpreting one or more borehole images according to the command.

The data storage device 316 can store data such as executable program code that is executed by the processor 314, the command actuator 340, or other processing devices. The processor 314 can be a central processing unit that is to execute an operating system in the computing system 300. As will be discussed, the data storage device 316 can specifically store computer code representing a number of applications that the processor 314 and/or the command actuator 340 can execute to implement at least the functionality described herein.

In one or more embodiments, the data storage device 316 can include various types of memory modules, including volatile and nonvolatile memory. In one or more embodiments, the data storage device 316 of the present example can include Random Access Memory ("RAM") 324, Read Only Memory ("ROM") 323, and Hard Disk Drive ("HDD") storage 328. Many other types of memory can also be utilized, and the present specification contemplates the use of many varying type(s) of memory in the data storage device 316 as can suit a particular application of the principles described herein. In certain examples, different types of memory in the data storage device 316 can be used for different data storage requirements. In one or more embodiments, in certain examples the processor 314 can boot from Read Only Memory ("ROM") 326, maintain nonvolatile storage in the Hard Disk Drive ("HDD") memory 328, and execute program code stored in Random Access Memory ("RAM") 324. In examples, the chip 305, and the chip 321 can boot from the Read Only Memory ("ROM") 326.

The data storage device 316 can include a computer readable medium, a computer readable storage medium, or a non-transitory computer readable medium, among others. In one or more embodiments, the data storage device 316 can be, an electronic, magnetic, optical, electromagnetic, infrared, or semiconductor system, apparatus, or device, or any suitable combination of the foregoing. More specific examples of the computer readable storage medium can include, for example, the following: an electrical connection having a number of wires, a portable computer diskette, a hard disk, a RAM, a ROM, an EPROM, a Flash memory, a portable compact disc read only memory ("CD-ROM"), an optical storage device, a magnetic storage device, or any suitable combination of the foregoing. In the context of this document, a computer readable storage medium can be any tangible medium that can contain, or store computer usable program code for use by or in connection with an instruction execution system, apparatus, or device. In another example, a computer readable storage medium can be any non-transitory medium that can contain or store a program for use by or in connection with an instruction execution system, apparatus, or device.

The hardware adapters 318, 320 in the computing system 300 can enable the processor 314 to interface with various other hardware elements, external and internal to the computing system 300. In one or more embodiments, the peripheral device adapters 318 can provide an interface to input/output devices, such as, for example, a display device 330, a mouse, and/or a keyboard. The peripheral device adapters 318 can also provide access to other external devices such as an external storage device, a number of network devices such as, for example, servers, switches, and routers, client devices, other types of computing devices, and combinations thereof.

The display device 330 can be provided to allow a user of the computing system 300 to interact with and implement the functionality of the computing system 300. Examples of display devices 330 can include a computer screen, a laptop screen, a mobile device screen, a personal digital assistant ("PDA") screen, and/or a tablet screen, among other display devices 330.

The peripheral device adapters 318 can also create an interface between the processor 314 and the display device 330, a printer, or other media output devices. The network adapter 320 can provide an interface to other computing devices within, for example, a network, thereby enabling the transmission of data between the computing system 300 and other devices located within the network. The network adapter 320 can provide an interface to an external telecommunications network such as a cellular phone network or other radio frequency enabled network, thereby enabling the transmission of data between the computing system 300 and other external devices such as an external storage device, a number of network devices such as, for example, servers, switches, and routers, client servers, radio frequency enabled devices, other client devices, other types of computing devices, and combinations thereof.

The computing system 300 can further include a number of modules used in the implementation of the process and systems described herein. The various modules within the computing system 300 can include executable program code that can be executed separately. In this example, the various modules can be stored as separate computer program products. In another example, the various modules within the computing system 300 can be combined within a number of computer program products; each computer program product including a number of the modules.

All patents and patent applications, test procedures (such as ASTM methods, UL methods, and the like), and other documents cited herein are fully incorporated by reference to the extent such disclosure can be not inconsistent with this disclosure and for all jurisdictions in which such incorporation can be permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof can be determined by the claims that follow.

What is claimed is:

1. A process, comprising:
    collecting a plurality of user-defined arguments relative to a plurality of borehole images, wherein at least one of the plurality of user-defined arguments corresponds to a type of geological formation or a feature of interest in a geological formation;
    training a machine-learning model based on the plurality of user-defined arguments, wherein the machine-learning model is configured to infer one or more additional user-defined arguments corresponding to the type of geological formation, the feature of interest in the geological formation, or both with respect to one or more additional borehole images;
    receiving an input borehole image obtained from a downhole measurement tool comprising one or more downhole sensors located within a borehole formed in a formation;
    collecting contextual information relative to the input borehole image;
    using the collected contextual information and the machine-learning model to infer one or more processing arguments, wherein the machine-learning model is defined by using previously collected arguments and previously collected contextual information;
    analyzing, via the machine-learning model, the input borehole image with the one or more inferred processing arguments to generate an interpreted borehole image comprising a recognized type of geological formation, a recognized feature of interest in the geological formation, or both; and
    adjusting one or more drilling operations based on the recognized type of geological formation, the recognized feature of interest in the geological formation, or both, wherein adjusting the one or more drilling operations comprises modifying geosteering of the drilling operations to follow a desired path based on the interpreted borehole image.

2. The process of claim 1, wherein the plurality of user-defined arguments further corresponds to a location of the borehole, an orientation of the borehole, one or more dips, a user profile, or a combination thereof.

3. The process of claim 1, wherein the plurality of user-defined arguments is obtained from a user.

4. The process of claim 1, wherein analyzing the input borehole image comprises performing a workflow comprising at least a first processing operation and a second processing operation, wherein an output of the first processing operation is used as an input of the second processing operation.

5. The process of claim 1, wherein the interpreted borehole image is obtained from the input borehole image without any user intervention.

6. The process of claim 1, wherein the one or more downhole sensors include an acoustic sensor, a radiation sensor, a seismic sensor, an electromagnetic sensor, or a combination thereof.

7. The process of claim 1, wherein the one or more downhole sensors are lowered into the borehole with the downhole measurement tool comprising a logging while drilling tool, a wireline tool, or a slickline tool.

8. The process of claim 1, further comprising determining one or more dips surrounding the borehole from the interpreted borehole image.

9. The process of claim 8, wherein the one or more dips surrounding the borehole are used to identify the recognized feature of interest in the geological formation.

10. The process of claim 1, wherein the input borehole image is displayed on a display.

11. The process of claim 10, wherein at least a portion of the plurality of user-defined arguments is provided by a user after viewing the input borehole image on the display.

12. The process of claim 1, wherein the one or more drilling operations include complete and incomplete boreholes.

13. The process of claim 1, wherein modifying geosteering of the drilling operations to follow the desired path comprises adjusting the desired path to maintain the borehole within a topmost geological layer of the formation.

14. The process of claim 1, wherein modifying geosteering of the drilling operations to follow the desired path comprises adjusting the desired path to cause the borehole to intersect a naturally occurring fracture within the formation.

15. The process of claim 1, wherein modifying geosteering of the drilling operations to follow the desired path comprises slowing down drilling, reducing a mud pressure, increasing a quantity of cement introduced into the borehole, and/or installing tubing within the borehole to prevent collapse.

* * * * *